United States Patent
Haas et al.

(10) Patent No.: US 11,719,151 B2
(45) Date of Patent: Aug. 8, 2023

(54) SYSTEMS AND METHODS FOR DIAGNOSIS OF NOX STORAGE CATALYST

(71) Applicant: Cummins Inc., Columbus, IN (US)

(72) Inventors: Michael Haas, Columbus, IN (US); Krishna Kamasamudrum, Columbus, IN (US); Ashok Kumar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/872,926

(22) Filed: Jul. 25, 2022

(65) Prior Publication Data

US 2022/0356833 A1 Nov. 10, 2022

Related U.S. Application Data

(63) Continuation of application No. 17/247,506, filed on Dec. 14, 2020, now Pat. No. 11,396,838, which is a (Continued)

(51) Int. Cl.
*F01N 11/00* (2006.01)
*F01N 9/00* (2006.01)
(Continued)

(52) U.S. Cl.
CPC ............ *F01N 11/002* (2013.01); *F01N 9/005* (2013.01); *F01N 11/007* (2013.01);
(Continued)

(58) Field of Classification Search
CPC ............... F01N 3/0842; F01N 2570/14; F01N 2900/1614; F01N 9/005; F01N 11/002; F01N 2560/026

See application file for complete search history.

(56) References Cited

U.S. PATENT DOCUMENTS 5,201,802 A * 4/1993 Hirota ................... F01N 11/002
60/287
5,400,592 A 3/1995 Mukaihira et al.
(Continued)

FOREIGN PATENT DOCUMENTS

DE 10312440 A1 * 10/2004 ............ F01N 11/007
EP 1 734 242 A1 12/2006
(Continued)

OTHER PUBLICATIONS

Machine translation of JP-2017057842-A, accessed Dec. 1, 2022. (Year: 2022).*

*Primary Examiner* — Jonathan R Matthias
(74) *Attorney, Agent, or Firm* — Foley & Lardner LLP

(57) ABSTRACT

A system includes a controller configured to perform an enable operation responsive to receiving information indicative of an enable parameter, the enable operation includes: determining a predicted downstream NOx value of an exhaust gas stream exiting a NOx storage catalyst; determining a downstream NOx value of the exhaust gas stream exiting the NOx storage catalyst; determining an error between the predicted downstream NOx value and the determined downstream NOx value; comparing the error to an error threshold; and determining that the NOx storage catalyst is in good health responsive to determining that the error does not exceed the error threshold. The controller is further configured to perform a disable operation responsive to receiving information indicative of a disable parameter, the disable operation causing a deactivation of at least a portion of the controller.

20 Claims, 6 Drawing Sheets

Related U.S. Application Data continuation of application No. 16/138,453, filed on Sep. 21, 2018, now Pat. No. 10,865,689.

(51) Int. Cl.
  *F01N 3/08* (2006.01)
  *F02D 41/02* (2006.01)

(52) U.S. Cl.
  CPC .......... *F01N 3/0814* (2013.01); *F01N 3/0842* (2013.01); *F01N 2550/02* (2013.01); *F01N 2550/03* (2013.01); *F01N 2560/026* (2013.01); *F01N 2570/14* (2013.01); *F01N 2900/1614* (2013.01); *F02D 41/0245* (2013.01)

(56) References Cited

U.S. PATENT DOCUMENTS

| | | | |
|---|---|---|---|
| 6,336,084 B1 | 1/2002 | Omara et al. | |
| 6,631,611 B2 | 10/2003 | Shi et al. | |
| 6,694,243 B2 | 2/2004 | Shi et al. | |
| 7,121,080 B2 | 10/2006 | Sun et al. | |
| 7,628,063 B2 | 12/2009 | Yezerets et al. | |
| 8,065,871 B1 | 11/2011 | Fraser | |
| 8,099,947 B2 | 1/2012 | Makki et al. | |
| 8,240,129 B2 | 8/2012 | Yezerets et al. | |
| 8,510,024 B2 | 8/2013 | Gady et al. | |
| 8,756,922 B2 | 6/2014 | Rattasiri et al. | |
| 9,021,789 B2 | 5/2015 | Sawada et al. | |
| 9,080,488 B2 | 7/2015 | Upadhyay et al. | |
| 9,109,493 B2 | 8/2015 | Lin et al. | |
| 2010/0024389 A1* | 2/2010 | Gady | B01D 53/9409 60/274 |
| 2012/0090297 A1* | 4/2012 | Yacoub | F01N 3/0885 60/276 |
| 2014/0223886 A1 | 8/2014 | Khaled et al. | |
| 2014/0301923 A1 | 10/2014 | Tang et al. | |
| 2014/0314645 A1 | 10/2014 | Ofoli et al. | |
| 2017/0350293 A1* | 12/2017 | De Smet | F01N 3/0871 |
| 2018/0245532 A1 | 8/2018 | Nakada et al. | |
| 2019/0390589 A1 | 12/2019 | Whitt et al. | |
| 2020/0040796 A1* | 2/2020 | Yoo | F02D 41/402 |
| 2020/0173328 A1* | 6/2020 | Majima | B01D 53/94 |

FOREIGN PATENT DOCUMENTS

| | | | |
|---|---|---|---|
| JP | 2017057842 A | * | 3/2017 |
| WO | WO-2014/070244 A1 | | 5/2014 |

* cited by examiner

SYSTEMS AND METHODS FOR DIAGNOSIS OF NOX STORAGE CATALYST

CROSS-REFERENCE TO RELATED APPLICATIONS

This application is a continuation of U.S. patent application Ser. No. 17/247,506, filed Dec. 14, 2020, which is a continuation of U.S. patent application Ser. No. 16/138,453, filed Sep. 21, 2018, both of which are incorporated herein by reference in their entireties.

TECHNICAL FIELD

The present disclosure relates to systems and methods for diagnosing nitrous oxide (NOx) storage catalysts. More particularly, the present disclosure relates to systems and methods for diagnosing cold start catalysts for engines and/or generators.

BACKGROUND

Emissions regulations for internal combustion engines have become more stringent over recent years. Environmental concerns have motivated the implementation of stricter emission requirements for internal combustion engines throughout much of the world. Government agencies, such as the Environmental Protection Agency (EPA) in the United States, carefully monitor the emission quality of engines and set emission standards to which engines must comply. Consequently, the use of exhaust aftertreatment systems on engines to reduce emissions is increasing.

Exhaust aftertreatment systems are generally designed to reduce emission of particulate matter, nitrogen oxides (NOx), hydrocarbons, and other environmentally harmful pollutants. In recent years, NOx storage catalysts are being used to reduce cold start emissions.

SUMMARY

One embodiment relates to an apparatus. The apparatus includes an upstream exhaust analysis circuit structured to determine a characteristic of an exhaust gas stream entering a nitrous oxide (NOx) storage catalyst. The apparatus further includes a prediction circuit structured to predict a downstream NOx concentration of an exhaust gas stream exiting the NOx storage catalyst based on a model of a NOx storage capacity or a dynamic response of the NOx storage catalyst. The apparatus further includes a downstream exhaust analysis circuit structured to determine a downstream NOx concentration of the exhaust gas stream exiting the NOx storage catalyst. The apparatus further includes a comparison circuit structured to compare the predicted downstream NOx concentration to the determined downstream NOx concentration, and to determine a health of the NOx storage catalyst based on the comparison.

Another embodiment relates to an apparatus. The apparatus includes an upstream exhaust analysis circuit structured to determine a characteristic of an exhaust gas stream entering a nitrous oxide (NOx) storage catalyst. The apparatus further includes a prediction circuit structured to predict a downstream NOx concentration of an exhaust gas stream exiting the NOx storage catalyst based on a model of a NOx storage capacity or a dynamic response of the NOx storage catalyst. The apparatus further includes a downstream exhaust analysis circuit structured to determine a downstream NOx concentration of the exhaust gas stream exiting the NOx storage catalyst. The apparatus further includes a comparison circuit structured to compare the predicted downstream NOx concentration to the determined downstream NOx concentration, and responsive to the comparison, generate a correction factor for the model.

Another embodiment relates to an apparatus. The apparatus includes an upstream exhaust analysis circuit structured to determine an enable parameter based on an exhaust gas stream entering a nitrous oxide (NOx) storage catalyst. The apparatus further includes a prediction circuit. The prediction circuit is structured to detect transience (e.g., perturbation) of a characteristic of the exhaust gas stream entering the NOx storage catalyst. The prediction circuit is further structured to predict a response of the characteristic to the NOx storage catalyst in response to detecting transience of the characteristic of the exhaust gas stream entering the NOx storage catalyst. The apparatus further includes a downstream exhaust analysis circuit structured to determine a response of the characteristic to the NOx storage catalyst. The apparatus further includes a comparison circuit structured to compare the predicted response to the determined response, and determine a health of the NOx storage catalyst based on the comparison.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for diagnosing a catalyst health of a cold start nitrous oxide (NOx) storage catalyst. The various concepts introduced above and discussed in greater detail below may be implemented in any number of ways, as the concepts described are not limited to any particular manner of implementation. Examples of specific implementations and applications are provided primarily for illustrative purposes.

Selective catalytic reduction (SCR) is typically used to in engine exhaust aftertreatment systems to reduce tailpipe NOx emissions. SCR is carried out by a SCR catalyst that is temperature sensitive; the SCR catalyst is most efficient in reducing NOx under relatively high temperature engine operating conditions. During relatively cool engine operating conditions, such as cold start engine operating conditions, the SCR is less efficient at reducing NOx in the exhaust gas stream, which can increase NOx emissions during low temperature engine operating conditions, such as cold start engine operating conditions. In the present disclosure, a NOx storage catalyst is included in the engine exhaust aftertreatment system substantially upstream of the SCR catalyst. The NOx storage catalyst is configured to bind NOx at the generally low exhaust gas temperatures that occur during cold start and other low temperature engine operating conditions. The NOx storage catalyst is configured to release NOx at the relatively high exhaust gas temperatures at which the SCR catalyst is efficient at reducing NOx. Accordingly, the combination of the NOx storage catalyst with the SCR catalyst can result in lower tailpipe NOx emissions.

The health of the NOx storage catalyst can degrade over time, resulting in a reduced NOx storage capacity and/or slower binding and release of NOx in the exhaust gas stream. Since NOx storage catalysts may lose storage capacity over time, it is desirable to monitor the health of the NOx storage and alert an operator that the NOx storage catalyst needs to be replaced or regenerated in response to determining a poor health of the NOx storage catalyst. After determining that the NOx storage catalyst is in poor health, a control system in communication with the exhaust aftertreatment system can set a fault indicative of poor health of the NOx storage catalyst. In some embodiments, the control system can display a message to an operator of the engine indicating the poor health of the NOx storage catalyst. In some embodiments, the control system can operate the engine to regenerate the NOx storage catalyst in response to receiving the fault indicative of the poor health of the NOx storage catalyst.

Referring to the figures generally, the various embodiments disclosed herein relate to systems, apparatuses, and methods for diagnosing a catalyst health of a cold start nitrous oxide (NOx) storage catalyst.

Figure 1:
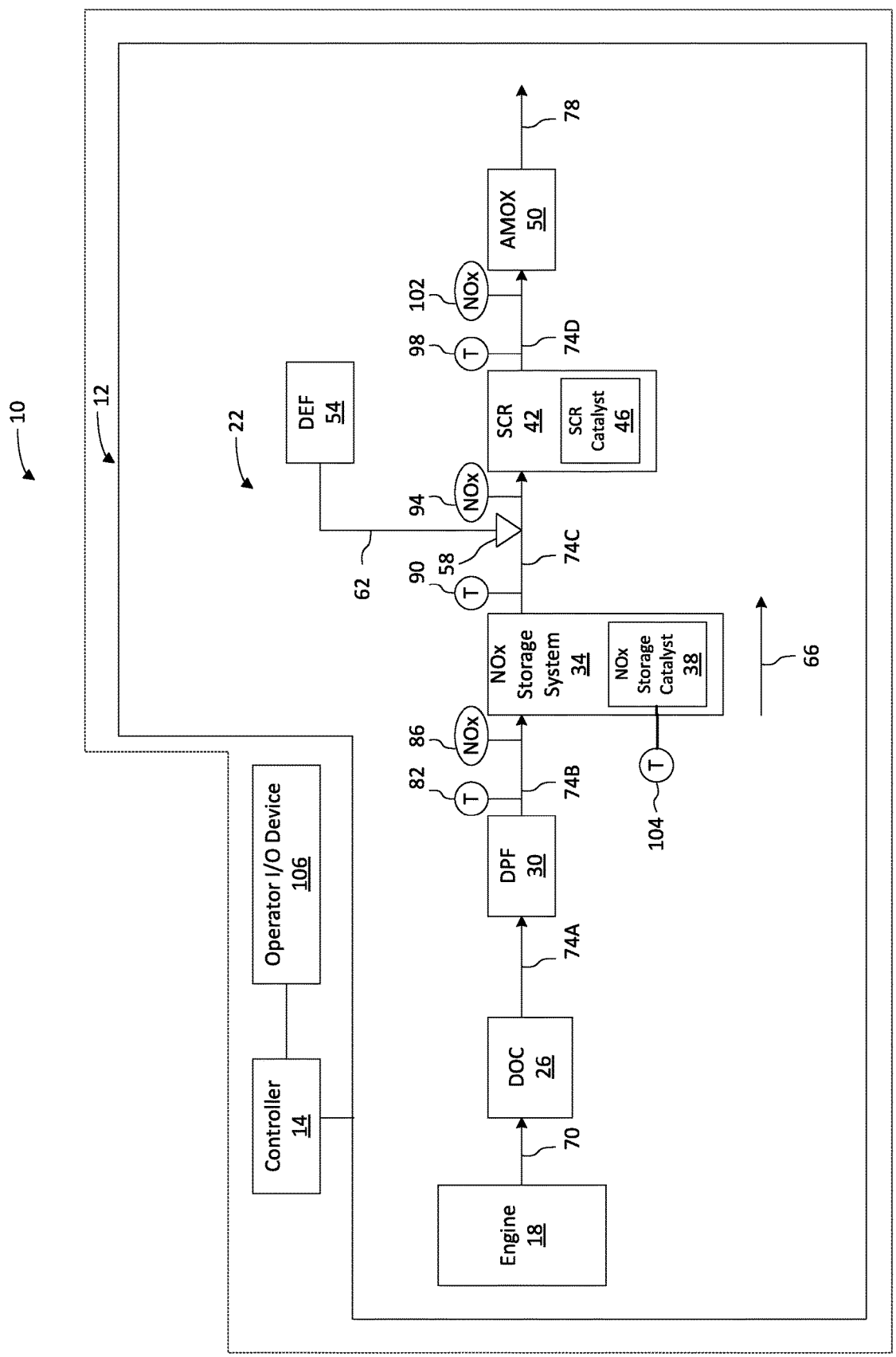
FIG. 1 is a schematic diagram of an exhaust aftertreatment system with a controller, according to an example embodiment.

Referring now to FIG. 1, a vehicle 10 having an engine system 12 including a controller 14 is shown, according to an example embodiment. As shown in FIG. 1, the engine system 12 includes an internal combustion engine, shown as engine 18, and an aftertreatment system, shown as exhaust aftertreatment system 22. The exhaust aftertreatment system 22 is in exhaust gas-receiving communication with the engine 18. According to one embodiment, the engine 18 is structured as a compression-ignition internal combustion engine that utilizes diesel fuel. However, in various alternate embodiments, the engine 18 may be structured as any other type of engine (e.g., spark-ignition) that utilizes any type of fuel (e.g., gasoline, natural gas). Within the engine 18, air from the atmosphere is combined with fuel, and combusted, to power the engine 18. Combustion of the fuel and air in the compression chambers of the engine 18 produces exhaust gas that is operatively vented to an exhaust manifold and to the exhaust aftertreatment system 22.

In the example depicted, the exhaust aftertreatment system 22 includes a diesel oxidation catalyst (DOC) 26, a diesel particulate filter (DPF) 30, a nitrous oxide (NOx) storage system 34 with a NOx storage catalyst 38, a selective catalytic reduction (SCR) system 42 with a SCR catalyst 46, and an ammonia oxidation (AMOx) catalyst 50. The SCR system 42 further includes a reductant delivery system that has a reductant source, shown as diesel exhaust fluid (DEF) source 54, that supplies reductant (e.g., DEF, ammonia) to a reductant doser, shown as DEF doser 58, via a reductant line, shown as DEF line 62. It should be noted that the components of the exhaust aftertreatment system 22 may be in any order, or different components and/or a different aftertreatment architecture may be used. In another example, the SCR system 42 may include multiple DEF dosers 58 positioned along the exhaust aftertreatment system 22. Although the exhaust aftertreatment system 22 shown includes one of the DOC 26, the DPF 30, the NOx storage catalyst 38, the SCR catalyst 46, and the AMOx catalyst 50 positioned in specific locations relative to each other along the exhaust flow path, in other embodiments, the exhaust aftertreatment system 22 may include more than one of any of the various catalysts positioned in any of various positions relative to each other along the exhaust flow path as desired so long as the NOx storage catalyst 38 is upstream of the SCR catalyst 46. Therefore, the architecture of the exhaust aftertreatment system 22 shown in FIG. 1 is for illustrative purposes and should not be limiting.

In an exhaust flow direction, as indicated by directional arrow 66, exhaust gas flows from the engine 18 into inlet piping 24 of the exhaust aftertreatment system 22. From the inlet piping 70, the exhaust gas flows into the DOC 26 and exits the DOC 26 into a first section of exhaust piping 74A. From the first section of exhaust piping 74A, the exhaust gas flows into the DPF 30 and exits the DPF 30 into a second section of exhaust piping 74B. From the second section of exhaust piping 74B, the exhaust gas flows into the NOx storage catalyst 38 and exits the NOx storage catalyst 38 into a third section of exhaust piping 74C. From the third section of exhaust gas piping, the exhaust gas flows into the SCR catalyst 46 and exits the SCR catalyst 46 into the fourth section of exhaust piping 74C. As the exhaust gas flows through the second section of exhaust piping 74B and/or the third section of exhaust piping 74C, it may be periodically dosed with reductant (e.g., DEF, urea) by the DEF doser 58. Accordingly, the second section of exhaust piping 74B and/or the third section of exhaust piping 74C may act as a decomposition chamber or tube to facilitate the decomposition of the reductant to ammonia. From the fourth section of exhaust piping 74D, the exhaust gas flows into the AMOx catalyst 50 and exits the AMOx catalyst 50 into outlet piping 78 before the exhaust gas is expelled from the exhaust aftertreatment system 22. Based on the foregoing, in the illustrated embodiment, the DOC 26 is positioned upstream of the DPF 30, the DPF 30 is positioned upstream of the NOx storage catalyst 38, the NOx storage catalyst 38 is positioned upstream of the SCR catalyst 46, and the SCR catalyst 46 is positioned upstream of the AMOx catalyst 50. However, in alternative embodiments, other arrangements of the components of the exhaust aftertreatment system 22 are also possible.

The DOC 26 may have any of various flow-through designs. Generally, the DOC 26 is structured to oxidize at least some particulate matter, e.g., the soluble organic fraction of soot, in the exhaust and reduce unburned hydrocarbons and carbon monoxide (CO) in the exhaust to less environmentally harmful compounds. For example, the DOC 26 may be structured to reduce the hydrocarbon and CO concentrations in the exhaust to meet the requisite emissions standards for those components of the exhaust gas. An indirect consequence of the oxidation capabilities of the DOC 26 is the ability of the DOC 26 to oxidize NO into NO2. In this manner, the level of NO2 exiting the DOC 26 is equal to the NO2 in the exhaust gas generated by the engine 18 plus the NO2 converted from NO by the DOC 26.

In addition to treating the hydrocarbon and CO concentrations in the exhaust gas, the DOC 26 may also be used in the controlled regeneration of the DPF 30, the NOx storage catalyst 38, the SCR catalyst 46, and the AMOx catalyst 50.

This can be accomplished through the injection, or dosing, of unburned HC into the exhaust gas upstream of the DOC 26. Upon contact with the DOC 26, the unburned HC undergoes an exothermic oxidation reaction which leads to an increase in the temperature of the exhaust gas exiting the DOC 26 and subsequently entering the DPF 30, the SCR catalyst 46, and/or the AMOx catalyst 50. The amount of unburned HC added to the exhaust gas is selected to achieve the desired temperature increase or target controlled regeneration temperature.

The DPF 30 may be any of various flow-through or wall-flow designs, and is structured to reduce particulate matter concentrations, e.g., soot and ash, in the exhaust gas to meet or substantially meet requisite emission standards. The DPF 30 captures particulate matter and other constituents, and thus may need to be periodically regenerated to burn off the captured constituents. Additionally, the DPF 30 may be structured to oxidize NO to form NO2 independent of the DOC 26.

As discussed above, the SCR system 42 may include a reductant delivery system with a reductant (e.g., DEF) source 54, a pump, and a delivery mechanism or doser 58. The reductant source 54 can be a container or tank capable of retaining a reductant, such as, for example, ammonia (NH3), DEF (e.g., urea), or diesel oil. The reductant source 54 is in reductant supplying communication with the pump, which is structured to pump reductant from the reductant source 54 to the doser 58 via a reductant delivery line 62. The doser 58 may be positioned upstream of the SCR catalyst 46. The doser 58 is selectively controllable to inject reductant directly into the exhaust gas stream prior to entering the NOx storage catalyst 38 and/or the SCR catalyst 46. In some embodiments, the reductant may either be ammonia or DEF, which decomposes to produce ammonia. As briefly described above, the ammonia reacts with NOx in the presence of the SCR catalyst 46 to reduce the NOx to less harmful emissions, such as N2 and H2O. The NOx in the exhaust gas stream includes NO2 and NO. Generally, both NO2 and NO are reduced to N2 and H2O through various chemical reactions driven by the catalytic elements of the SCR catalyst 46 in the presence of NH3.

The NOx storage catalyst 38 may be any of various cold storage catalysts known in the art. For example, in some implementations, the NOx storage catalyst 38 can be a Passive NOx Adsorber (PNA) catalyst, a Diesel Cold Start Catalyst (dCSC), and/or a Diesel Cold Start Concept (dCSC) catalyst. The NOx storage catalyst 38 is configured to bind (e.g., store) NOx, hydrocarbons (HC), and/or oxygen at substantially low exhaust gas temperatures and then release and/or oxidize the bound NOx and/or HC at substantially higher temperatures. The NOx storage catalyst 38 can thus reduce an amount of NOx exiting the tailpipe of the vehicle 10 during low temperature operating conditions, such as cold start engine operating conditions.

The SCR catalyst 46 may be any of various catalysts known in the art. For example, in some implementations, the SCR catalyst 46 is a vanadium-based catalyst, and in other implementations, the SCR catalyst 46 is a zeolite-based catalyst, such as a Cu-Zeolite or a Fe-Zeolite catalyst. In some embodiments, an efficiency of the SCR catalyst 46 is temperature dependent, meaning that the SCR catalyst 46 is more efficient at reducing the NOx into less-harmful emissions at various temperature ranges compared to other temperature ranges. For example, in some embodiments, the SCR catalyst 46 is more efficient at reducing NOx into less-harmful emissions at higher temperatures. Accordingly, in some embodiments, the NOx storage catalyst 38 can be structured to release NOx at a temperature range in which the SCR catalyst 46 is more efficient in reducing the NOx into less-harmful emissions. For example, under cold start engine operating conditions, the NOx storage catalyst 38 can be structured to bind NOx in the exhaust gas stream at temperatures substantially below the temperature range in which the SCR catalyst 46 is efficient in reducing NOx into less-harmful emissions. The NOx storage catalyst 38 can be structured to release NOx into the exhaust gas stream at temperatures substantially within the temperature range in which the SCR catalyst 46 is efficient in reducing NOx into less-harmful emissions. Accordingly, the use of the NOx storage catalyst 38 in conjunction with the SCR storage catalyst 46 can further reduce vehicle tailpipe NOx emissions by storing NOx from the exhaust gas stream at temperatures at which the SCR catalyst 46 is relatively inefficient at reducing NOx and releasing NOx into the exhaust gas stream upstream of the SCR catalyst 46 at temperatures at which the SCR catalyst 46 is efficient at reducing NOx.

The AMOx catalyst 50 may be any of various flow-through catalysts structured to react with ammonia to produce mainly nitrogen. As briefly described above, the AMOx catalyst 50 is structured to remove ammonia that has slipped through or exited the SCR catalyst 46 without reacting with NOx in the exhaust. In certain instances, the exhaust aftertreatment system 22 may be operable with or without the AMOx catalyst 50. Further, although the AMOx catalyst 50 is shown as a separate unit from the SCR catalyst 46 in FIG. 1, in some implementations, the AMOx catalyst 50 may be integrated with the SCR catalyst 46, e.g., the AMOx catalyst 50 and the SCR catalyst 46 may be located within the same housing. According to the present disclosure, the SCR catalyst 46 and the AMOx catalyst 50 are positioned serially, with the SCR catalyst 46 preceding the AMOx catalyst 50. As described above, in various other embodiments, the AMOx catalyst 50 is not included in the exhaust aftertreatment system 22.

Referring still to FIG. 1, the exhaust aftertreatment system 22 may include various sensors, such as NOx sensors, oxygen sensors, temperature sensors, reductant sensors, pressure sensors, flow rate sensors, and so on. The various sensors may be strategically disposed throughout the exhaust aftertreatment system 22 and may be in communication with the controller 14 to monitor operating conditions of the exhaust aftertreatment system 22 and/or the engine 18. As shown in FIG. 1, the exhaust aftertreatment system 22 includes a first temperature sensor 82 positioned at or upstream of an inlet of the NOx storage system 34, a first NOx sensor 86 positioned at or upstream of the inlet of the NOx storage system 34, a second temperature sensor 90 positioned at or downstream of an outlet of the NOx storage system 34, a second NOx sensor 94 positioned at or downstream of the outlet of the NOx storage system 34, a third temperature sensor 98 positioned at or proximate an outlet of the exhaust aftertreatment system 22, and a third NOx sensor 102 positioned at or proximate the outlet of the exhaust aftertreatment system 22. The first temperature sensor 82 and the first NOx sensor 86 are structured to determine information indicative of a temperature and a NOx concentration, respectively, of the exhaust gas stream entering the NOx storage system 34. The second temperature sensor 90 and the second NOx sensor 94 are structured to determine information indicative of a temperature and a NOx concentration, respectively, of the exhaust gas stream exiting the NOx storage system 34. The third temperature sensor 98 and the third NOx sensor 102 are structured to determine information indicative of a temperature and a NOx concentration, respectively, of the exhaust gas stream exiting the exhaust aftertreatment system 22. The exhaust aftertreatment system 22 includes a fourth temperature sensor 104 engaged with the NOx storage system 34 for determining information indicative of a temperature of the NOx storage catalyst 38. In other embodiments, a virtual NOx sensor or any other virtual sensor is used instead of a physical sensor at the locations shown in FIG. 1 and/or described above. While FIG. 1 depicts several sensors (e.g., first NOx sensor 86, first temperature sensor 82, second NOx sensor 94, second temperature sensor 90, third NOx sensor 102, third temperature sensor 98, fourth temperature sensor 104), it should be understood that one or more of these sensors may be replaced by virtual sensor in other embodiments. In this regard, the NOx amount at various locations may be estimated, determined, or otherwise correlated with various operating conditions of the engine 18 and exhaust aftertreatment system 22. For example, based on the operating conditions of the engine 18 and/or a temperature of the exhaust gas stream, an amount of NOx exiting the engine 18 may be determined. The determination may utilize a look-up table that correlates various operating conditions with expected NOx amounts, which can be based on data determined during testing. The determination may also utilize any of a model, formula, equation, process, and the like to otherwise determine an NOx amount at a particular location without the use of a physical sensor. For example, in some embodiments, the NOx sensors 86, 94, 102 may not be turned on at low exhaust gas temperatures. Accordingly, the NOx sensors 86, 94, 102 may not be turned on during cold start operating conditions. In such embodiments, the first NOx sensor 86 may be a virtual NOx sensor that determines the NOx concentration at or upstream of the inlet of the NOx storage catalyst 38 based on operating conditions of the engine 18 (e.g., using a mathematical model and/or a lookup table).

FIG. 1 is also shown to include an operator input/output (I/O) device 106. The operator I/O device 106 is communicably coupled to the controller 14, such that information may be exchanged between the controller 14 and the operator I/O device 106, wherein the information may relate to one or more components of FIG. 1 or determinations (described below) of the controller 14. The operator I/O device 106 enables an operator of the engine system 12 to communicate with the controller 14 and one or more components of the engine system 12 of FIG. 1. For example, the operator I/O device 106 may include, but is not limited to, an interactive display, a touchscreen device, one or more buttons and switches, voice command receivers, etc. In various alternate embodiments, the controller 14 and components described herein may be implemented with non-vehicular applications (e.g., a power generator). Accordingly, the operator I/O device 106 may be specific to those applications. For example, in those instances, the operator I/O device 106 may include a laptop computer, a tablet computer, a desktop computer, a phone, a watch, a personal digital assistant, etc. Via the operator I/O device 106, the controller 14 may provide a fault or service notification based on a determined state (e.g., faulty, operational) of the NOx storage catalyst 38.

The controller 14 is structured to control the operation of the engine system 12 and associated sub-systems, such as the internal combustion engine 18 and the exhaust aftertreatment system 22. According to one embodiment, the components of FIG. 1 are embodied in a vehicle 10. The vehicle may include an on-road or an off-road vehicle including, but not limited to, line-haul trucks, mid-range trucks (e.g., pick-up trucks), cars, boats, tanks, airplanes, and any other type of vehicle that utilizes an exhaust aftertreatment system. In various alternate embodiments, as described above, the controller 14 may be used with any engine-exhaust aftertreatment system (e.g., a stationary power generation system).

Components of the vehicle 10 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 14 is communicably coupled to the systems and components in the vehicle 10 of FIG. 1, the controller 14 is structured to receive data regarding one or more of the components shown in FIGS. 1 and 2. For example, the data may include operation data regarding the operating conditions of the engine 18, the NOx storage catalyst 38, the DEF doser 58, the SCR catalyst 46 and/or other components (e.g., a battery system, a motor, a generator, a regenerative braking system) acquired by one or more sensors.

As the components of FIG. 1 are shown to be embodied in the engine system, the controller 14 may be structured as one or more electronic control units (ECU). The controller 14 may be separate from or included with at least one of a transmission control unit, an exhaust aftertreatment control unit, a powertrain control circuit, an engine control circuit, etc. The function and structure of the controller 14 is described in greater detail in FIG. 2.

The operator I/O device 106 may enable an operator of the vehicle 10 (or passenger or manufacturing, service, or maintenance personnel) to communicate with the vehicle 10 and the controller 14. By way of example, the operator I/O device 106 may include, but is not limited to, an interactive display, a touchscreen device, one or more buttons and switches, voice command receivers, and the like. In one embodiment, the operator I/O device 106 may display fault indicators to the operator of the vehicle.

Figure 2:
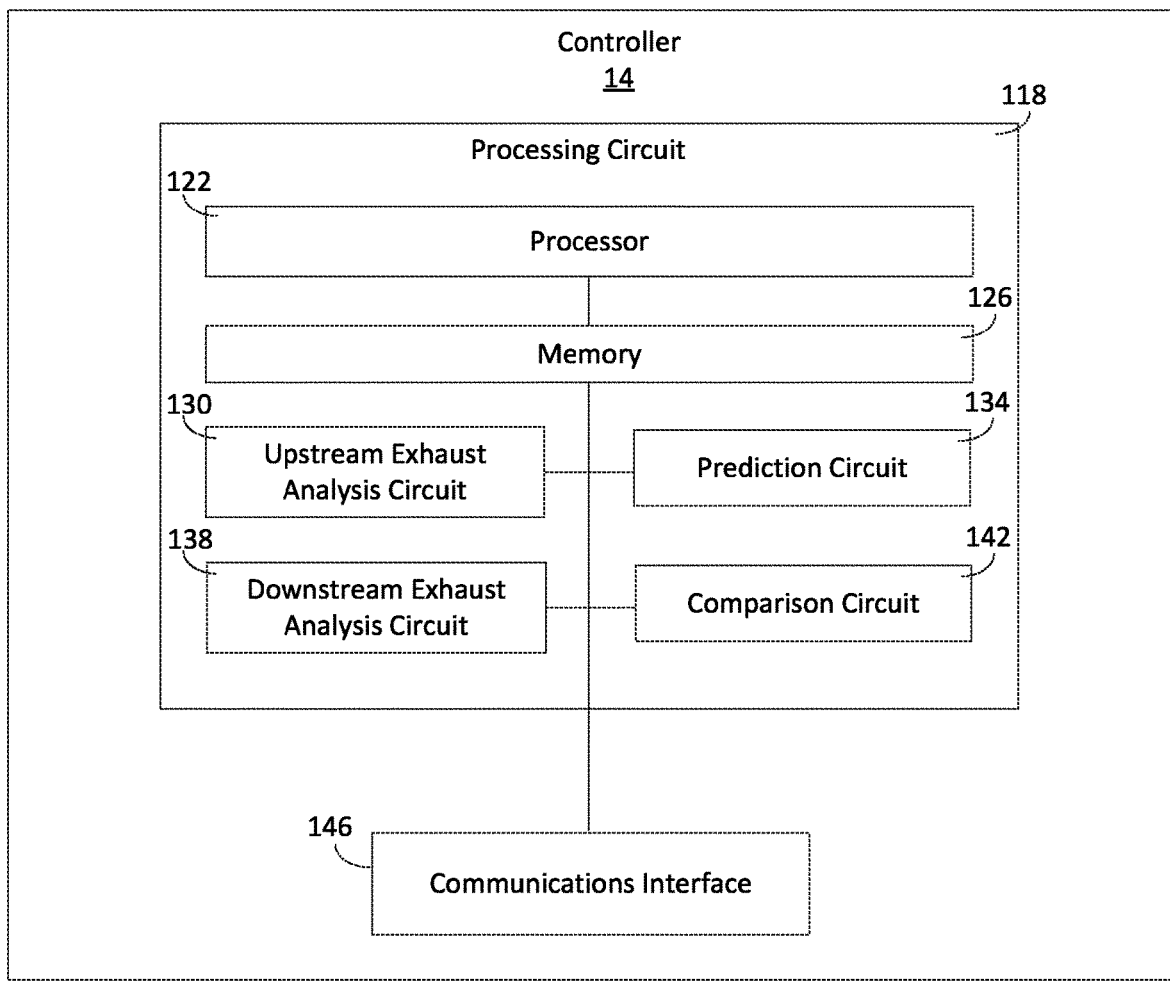
FIG. 2 is a schematic diagram of the controller of the system of FIG. 1 according to an example embodiment.

As the components of FIGS. 1-2 are shown to be embodied in the vehicle 10, the controller 14 may be structured as one or more electronic control units (ECU). As such, the controller 14 may be separate from or included with at least one of a transmission control unit, an exhaust aftertreatment control unit, a powertrain control circuit, an engine control circuit, etc. The function and structure of the controller 14 is described in greater detail in FIG. 2.

Referring now to FIG. 2, a schematic diagram of the controller 14 of the vehicle 10 of FIG. 1 is shown according to an example embodiment. As shown in FIG. 2, the controller 14 includes a processing circuit 118 having a processor 122 and a memory device 126, an upstream exhaust analysis circuit 130, a prediction circuit 134, a downstream exhaust analysis circuit 138, a comparison circuit 142 and the communications interface 146. Generally, the controller 14 is structured to determine a health of the NOx storage catalyst based on information received from at least some of the temperature sensors 82, 90, 98, 104 and the NOx sensors 86, 94, 102.

In one configuration, the upstream exhaust analysis circuit 130, the prediction circuit 134, the downstream exhaust analysis circuit 138, and the comparison circuit 142 are embodied as machine or computer-readable media that is executable by a processor, such as processor 122. As described herein and amongst other uses, the machine-readable media facilitates performance of certain operations to enable reception and transmission of data. For example, the machine-readable media may provide an instruction (e.g., command) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus).

In another configuration, the upstream exhaust analysis circuit 130, the prediction circuit 134, the downstream exhaust analysis circuit 138, and the comparison circuit 142 may be embodied as one or more circuitry components including, but not limited to, processing circuitry, network interfaces, peripheral devices, input devices, output devices, sensors, etc. In some embodiments, upstream exhaust analysis circuit 130, the prediction circuit 134, the downstream exhaust analysis circuit 138, and the comparison circuit 142 may take the form of one or more analog circuits, electronic circuits (e.g., integrated circuits (IC), discrete circuits, system on a chip (SOCs) circuits, microcontrollers), telecommunication circuits, hybrid circuits, and any other type of "circuit." In this regard, upstream exhaust analysis circuit 130, the prediction circuit 134, the downstream exhaust analysis circuit 138, and the comparison circuit 142 may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on). The upstream exhaust analysis circuit 130, the prediction circuit 134, the downstream exhaust analysis circuit 138, and the comparison circuit 142 may also include programmable hardware devices such as field programmable gate arrays, programmable array logic, programmable logic devices or the like. The upstream exhaust analysis circuit 130, the prediction circuit 134, the downstream exhaust analysis circuit 138, and the comparison circuit 142 may include one or more memory devices for storing instructions that are executable by the processor(s) of the upstream exhaust analysis circuit 130, the prediction circuit 134, the downstream exhaust analysis circuit 138, and the comparison circuit 142. The one or more memory devices and processor(s) may have the same definition as provided below with respect to the memory device 126 and processor 122. In some hardware unit configurations, upstream exhaust analysis circuit 130, the prediction circuit 134, the downstream exhaust analysis circuit 138, and the comparison circuit 142 may be geographically dispersed throughout separate locations in the vehicle. Alternatively and as shown, upstream exhaust analysis circuit 130, the prediction circuit 134, the downstream exhaust analysis circuit 138, and the comparison circuit 142 may be embodied in or within a single unit/housing, which is shown as the controller 14.

In the example shown, the controller 14 includes a processing circuit 118 having the processor 122 and the memory device 126. The processing circuit 118 may be structured or configured to execute or implement the instructions, commands, and/or control processes described herein with respect to the upstream exhaust analysis circuit 130, the prediction circuit 134, the downstream exhaust analysis circuit 138, and the comparison circuit 142. The depicted configuration represents the upstream exhaust analysis circuit 130, the prediction circuit 134, the downstream exhaust analysis circuit 138, and the comparison circuit 142 as machine or computer-readable media. However, as mentioned above, this illustration is not meant to be limiting as the present disclosure contemplates other embodiments where the upstream exhaust analysis circuit 130, the prediction circuit 134, the downstream exhaust analysis circuit 138, and the comparison circuit 142 or at least one circuit of the upstream exhaust analysis circuit 130, the prediction circuit 134, the downstream exhaust analysis circuit 138, and the comparison circuit 142 is configured as a hardware unit. All such combinations and variations are intended to fall within the scope of the present disclosure.

The processor 122 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the upstream exhaust analysis circuit 130, the prediction circuit 134, the downstream exhaust analysis circuit 138, and the comparison circuit 142 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 126 (e.g., RAM, ROM, Flash Memory, hard disk storage) may store data and/or computer code for facilitating the various processes described herein. The memory device 126 may be communicably connected to the processor 122 to provide computer code or instructions to the processor 122 for executing at least some of the processes described herein. Moreover, the memory device 126 may be or include tangible, non-transient volatile memory or non-volatile memory. Accordingly, the memory device 126 may include database components, object code components, script components, or any other type of information structure for supporting the various activities and information structures described herein.

The communications interface 146 may include wired or wireless interfaces (e.g., jacks, antennas, transmitters, receivers, transceivers, wire terminals) for conducting data communications with various systems, devices, or networks. For example, the communications interface 146 may include an Ethernet card and port for sending and receiving data via an Ethernet-based communications network and/or a Wi-Fi transceiver for communicating via a wireless communications network. The communications interface 146 may be structured to communicate via local area networks or wide area networks (e.g., the Internet) and may use a variety of communications protocols (e.g., IP, LON, Bluetooth, ZigBee, radio, cellular, near field communication).

The communications interface 146 of the controller 14 may facilitate communication between and among the controller 14 and one or more components of the vehicle 10

(e.g., the engine 18, the exhaust aftertreatment system 22, the temperature sensors 82, 90, 98, 104, the NOx sensors 86, 94, 102). Communication between and among the controller 14 and the components of the vehicle 10 may be via any number of wired or wireless connections (e.g., any standard under IEEE 802). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The upstream exhaust analysis circuit 130 is structured to receive information indicative of a characteristic of the exhaust gas stream at or proximate an inlet of the NOx storage system 34. The characteristic of the exhaust gas stream can include a NOx concentration, a temperature, and/or an oxygen concentration. The upstream exhaust analysis circuit 130 may receive the information indicative of the characteristic of the exhaust gas stream from the sensors 82, 86, 90, 94, 98, 102 or the virtual sensors. In some embodiments, the upstream exhaust analysis circuit 130 can integrate the information indicative of the characteristic of the exhaust gas stream at or proximate the inlet of the NOx storage system over a predetermined time period. More particularly, in some embodiments, the characteristic is the NOx concentration of the exhaust gas stream at or proximate the inlet of the NOx storage system 34 and the upstream exhaust analysis circuit 130 can integrate the NOx concentration of the exhaust gas stream at or proximate the inlet of the NOx storage system 34 to generate an integrated upstream NOx concentration over the predetermined time period.

The prediction circuit 134 is structured to predict a downstream concentration of NOx at or proximate an exit of the NOx storage system 34. For example, in some implementations, the prediction circuit 134 can be structured to receive information indicative of a temperature of the NOx storage catalyst 38 from the fourth temperature sensor 104. The prediction circuit 134 can predict a NOx storage capacity of the NOx storage catalyst 38 based on the information indicative of the temperature of the NOx storage catalyst 38. For example, in some embodiments, the prediction circuit 134 may predict that the NOx storage catalyst 38 can store approximately 0.4 grams NOx per liter of NOx storage catalyst through approximately 1.0 grams of NOx per liter of NOx storage catalyst. More particularly, in some embodiments, the NOx storage catalyst can store approximately 0.7 grams of NOx per liter NOx storage catalyst. In some embodiments, the NOx storage catalyst 38 can store approximately 0.2 grams of NOx per liter of NOx storage catalyst through approximately 3.0 grams of NOx per liter of NOx storage catalyst. The prediction circuit 134 can then determine the downstream concentration of NOx at or proximate the exit of the NOx storage system 34 based on the information indicative of the characteristic of the exhaust gas stream and the predicted NOx storage capacity of the NOx storage catalyst 38. In some embodiments, the prediction circuit 134 is structured to predict the downstream NOx storage at or proximate the exit of the NOx storage system 34 based on a lookup table. The lookup table may include data indicative of a NOx storage capacity based on a temperature of the NOx storage catalyst 38. The lookup table may further include information indicative of the downstream NOx concentration at or proximate the NOx storage catalyst 38 based on the NOx storage capacity of the NOx storage catalyst 38 and at least a NOx concentration or an oxygen concentration at or proximate the inlet of the NOx storage catalyst. In other embodiments, the prediction circuit 134 may include a mathematical model of the NOx storage catalyst 38. The mathematical model can be structured to predict the downstream NOx storage at or proximate the exit of the NOx storage system 34. The mathematical model may include data indicative of a NOx storage capacity based on a temperature of the NOx storage catalyst 38. The mathematical model may further include information indicative of the downstream NOx concentration at or proximate the NOx storage catalyst 38 based on the NOx storage capacity of the NOx storage catalyst 38 and at least a NOx concentration or an oxygen concentration at or proximate the inlet of the NOx storage catalyst 38.

In another embodiment, the prediction circuit 134 can be structured to predict an amount of NOx stored by the NOx storage catalyst 38 based on a temperature of the NOx storage catalyst 38 and the information indicative of the characteristic of the exhaust gas stream at or proximate the inlet of the NOx storage system 34. In some embodiments, the prediction circuit 134 can include a lookup table similar to the lookup table described above. In some embodiments, the prediction circuit 134 can include a mathematical model similar to the mathematical model described above.

The downstream exhaust analysis circuit 138 is structured to receive information indicative of a NOx concentration of the exhaust gas stream at or proximate the outlet of the NOx storage system 34. The downstream exhaust analysis circuit 138 is structured to determine a NOx concentration at or proximate the outlet of the NOx storage system 34 based on the information indicative of the NOx concentration based on the information indicative of the NOx concentration of the exhaust gas stream at or proximate the outlet of the NOx storage system 34. The downstream exhaust analysis circuit may receive the information indicative of the characteristic of the exhaust gas stream from the sensors 94, 102 or the virtual sensors. In some embodiments, the downstream exhaust analysis circuit 138 can integrate the NOx concentration of the exhaust gas stream at or proximate the outlet of the NOx storage system 34 to generate an integrated downstream NOx concentration over the predetermined time period.

The comparison circuit 142 is structured to receive the predicted downstream NOx concentration from the prediction circuit 134 and the determined downstream NOx concentration from the downstream exhaust analysis circuit 138. The comparison circuit 142 is structured to compare the predicted downstream NOx concentration and determined downstream NOx concentration. For example, in some embodiments, the comparison circuit 142 is structured to determine a difference between the predicted downstream NOx concentration and the determined downstream NOx concentration. In response to determining that the determined downstream NOx concentration is less than or equal to the predicted downstream NOx concentration, the comparison circuit 142 determines that NOx storage catalyst 38 is healthy. The health of the NOx storage catalyst can be based on a storage capability of the NOx storage catalyst exceeding a predetermined NOx storage capability and/or at least a predetermined rate of NOx binding and/or NOx release exceeding one or more thresholds. In response to determining that the difference is greater than an error threshold or difference threshold, the comparison circuit 142 determines that the NOx storage catalyst 38 is unhealthy. The difference threshold is based on a minimum value of the difference between the predicted downstream NOx concentration and the determined downstream NOx concentration that indicates that the NOx storage catalyst 38 is unhealthy. The phrase "unhealthy" is used herein to refer to a NOx storage catalyst that has less than the predetermined NOx storage capacity and/or less than the predetermined rate of NOx binding and/or NOx release. In response to determining that the NOx storage catalyst 38 is unhealthy, the comparison circuit 142 can set a fault indicating that the NOx storage catalyst is unhealthy. In some embodiments, the comparison circuit 142 can display the fault to an operator of the vehicle 10 via the operator I/O device 106. In some embodiments, the comparison circuit 142 can initiate regenerative activity in an attempt to clear the fault. For example, in some embodiments, the comparison circuit 142 can command the engine 18 to increase a temperature of the exhaust gas stream. In some embodiments, increasing a temperature of the exhaust gas stream can burn residue and/or contaminates off of the NOx storage catalyst 38, thereby regenerating the NOx storage catalyst 38 to improve the health of the NOx storage catalyst 38.

In some embodiments, the comparison circuit 142 can receive the integrated upstream NOx concentration and the integrated downstream NOx concentration. The comparison circuit 142 may integrate the NOx concentration at or proximate the inlet of the NOx storage catalyst 38 and the NOx concentration at or proximate the outlet of the NOx storage catalyst 38 for a predetermined time period. The comparison circuit 142 may determine an amount of NOx stored and/or released from the NOx storage catalyst 38 based on the integration. The comparison circuit 142 may then compare the amount of NOx stored and/or released from the NOx storage catalyst 38 to determine a health of the NOx storage catalyst 38.

In some embodiments, the upstream exhaust analysis circuit 130 and/or the prediction circuit 134 are responsive to an enable parameter. In such an embodiment, the upstream exhaust analysis circuit 130 is structured to determine the characteristic of the exhaust gas stream in response to detecting the enable parameter. In some embodiments, the enable parameter can be a temperature of the exhaust gas stream. For example, in embodiments in which the NOx storage catalyst health is determined by the NOx storage capacity of the NOx storage catalyst 38 during cold start conditions, the enable parameter can be a temperature of the exhaust gas stream that is indicative of cold start operating conditions. In embodiments in which the NOx storage catalyst health is determined by the release of stored NOx at or near the onset of warm engine operating conditions (e.g., where the temperature of the engine or environment of the engine is greater than a temperature threshold), the enable parameter can be a temperature of the exhaust gas stream that is at or near the warm engine operating temperature after the exhaust gas stream that is indicative of cold start operating conditions. The warm engine temperature can be between substantially 150° C. and 200° C.

In some embodiments, the NOx storage catalyst 38 releases NOx during motoring conditions. As used herein, the phrase "motoring" refers to operating the engine at a speed and/or a temperature at which engine out NOx is substantially zero. In such embodiments, the enable parameter is motoring. In such an embodiment, the prediction circuit 134 predicts NOx release from the NOx storage catalyst 38. Since the engine out NOx is substantially zero, the downstream NOx concentration determined by the second NOx sensor 94 is substantially NOx that has been released from the NOx storage catalyst 38. Accordingly, the amount of NOx exiting the NOx storage system 34 during motoring can be used to determine a storage capacity of the NOx storage catalyst 38.

In some embodiments, the enable parameter can be a DPF regeneration or other high temperature event. More specifically, the enable parameter can be completion of the DPF regeneration or other high temperature event. As the temperature decreases after the DPF regeneration or other high temperature event, the NOx concentration at or proximate the inlet of the NOx storage catalyst 38 is high and the NOx concentration at or proximate the outlet of the NOx storage catalyst 38 is low (e.g., substantially zero). The downstream NOx concentration determined by the second NOx sensor 94 increases when the NOx storage catalyst 38 is saturated. The comparison circuit 142 can then integrate the inlet NOx concentration and the outlet NOx concentration over the time period between the occurrence of the enable parameter and the time at which the NOx storage catalyst 38 is saturated to determine a health of the NOx storage catalyst 38. In some embodiments, the enable parameter can be a start of a high temperature event, and the comparison circuit 142 can integrate release of NOx from the NOx storage catalyst 38 as the temperature increases in a manner similar to what is described above.

In some embodiments, the upstream exhaust analysis circuit 130 and/or the prediction circuit 134 are responsive to a disable parameter. In such an embodiment, the upstream exhaust analysis circuit 130 is structured to determine the characteristic of the exhaust gas stream in response to detecting the disable parameter. In some embodiments, the disable parameter can be a temperature of the exhaust gas stream. For example, in embodiments in which the NOx storage catalyst health is determined by the NOx storage capacity of the NOx storage catalyst 38 during cold start conditions, the disable parameter can be a temperature of the exhaust gas stream that is indicative of warm engine operating conditions. In other embodiments, in embodiments in which the NOx storage catalyst health is determined by the release of stored NOx at or near the onset of warm engine operating conditions, the enable parameter can be a temperature of the exhaust gas stream that is at or near the warm temperature for at least a predetermined period of time.

Figure 3:
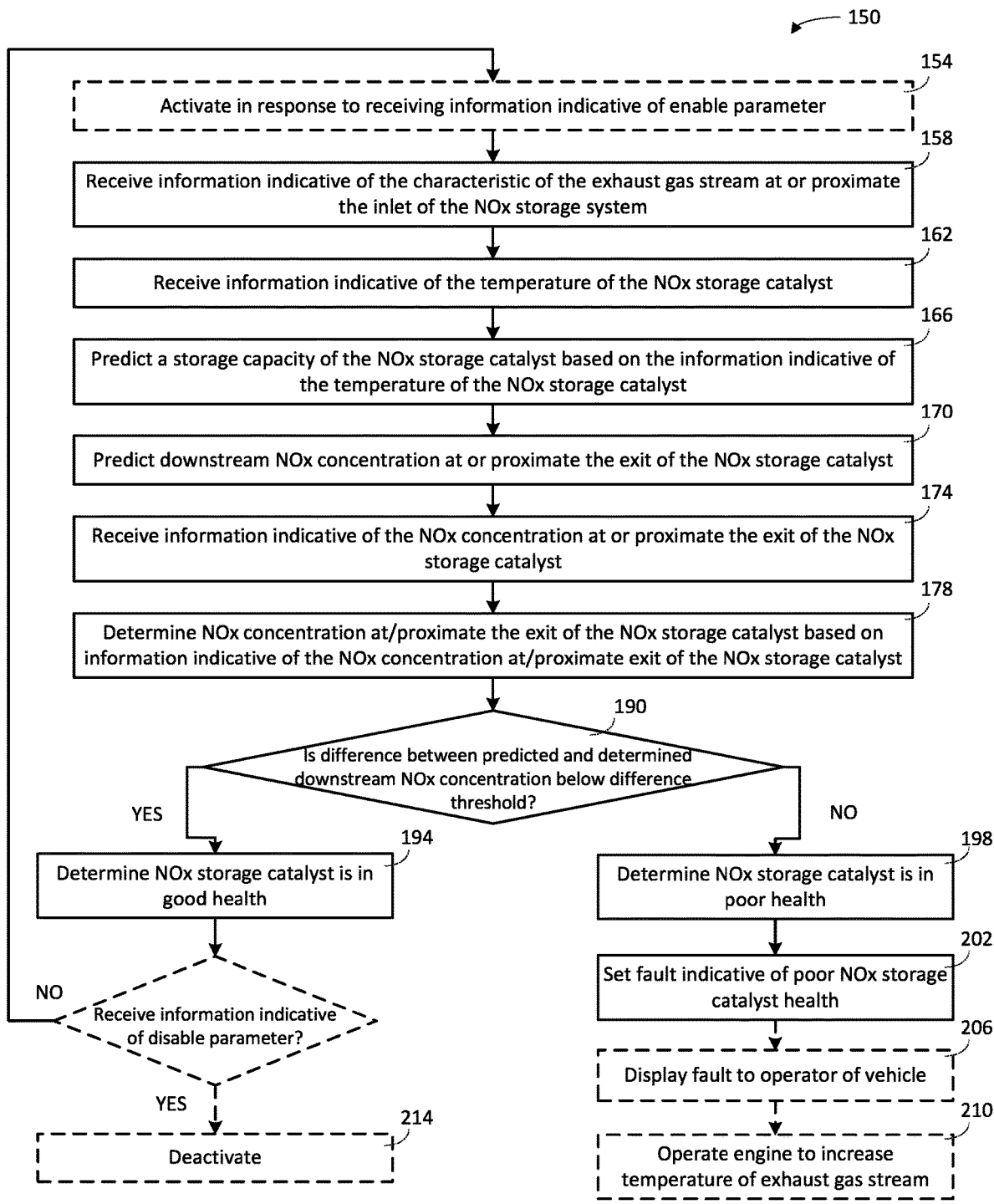
FIG. 3 is a flow diagram of a method for diagnosing a storage capacity of a NOx storage catalyst according to an example embodiment.

FIG. 3 illustrates an exemplary method 150 for determining a health of the NOx storage catalyst 38. At process 154, in some embodiments, the upstream exhaust analysis circuit 130 and/or the prediction circuit 134 may activate in response to receiving information indicative of the enable parameter. At process 158, the upstream exhaust analysis circuit 130 receives information indicative of the characteristic of the exhaust gas stream at or proximate the inlet of the NOx storage system 34 from the sensors 82, 86 and/or the virtual sensors. At process 162, the prediction circuit 134 receives information indicative of the temperature of the NOx storage catalyst 38 from the sensor 104 or the virtual sensor. At process 166, the prediction circuit 134 predicts a storage capacity of the NOx storage catalyst 38 based on the information indicative of the temperature of the NOx storage catalyst 38. At process 170, the prediction circuit 134 predicts the downstream NOx concentration at or proximate the exit of the NOx storage catalyst 38 based on the characteristic of the exhaust gas stream and the predicted NOx storage capacity of the NOx storage catalyst 38. At process 174, the downstream exhaust analysis circuit 138 receives information indicative of the NOx concentration at or proximate an exit of the NOx storage catalyst 38 from the sensors 94, 102 or a virtual sensor. At process 178, the downstream exhaust analysis circuit 138 determines the NOx concentration at or proximate the exit of the NOx storage catalyst 38 based on the information indicative of the NOx concentration at or proximate the exit of the NOx storage catalyst 38. The comparison circuit 142 receives the predicted downstream NOx concentration from the prediction circuit 134 and the comparison circuit 142 receives the determined downstream NOx concentration from the downstream exhaust analysis circuit 138. At process 190, the comparison circuit 142 compares the predicted downstream NOx concentration to the determined downstream NOx concentration. For example, in some embodiments, the comparison circuit 142 may determine a difference between the predicted downstream NOx concentration and the determined downstream NOx concentration. At process 194, in response to determining that the difference between the predicted downstream NOx concentration and the determined downstream NOx concentration is below the difference threshold, the comparison circuit 142 determines that the NOx storage catalyst 38 is in good health. At process 198, in response to the difference between the predicted downstream NOx concentration and the determined downstream NOx concentration exceeding the difference threshold, the comparison circuit 142 determines that the NOx storage catalyst 38 is in poor health. At process 202, the comparison circuit 142 sets a fault indicating that the NOx storage catalyst 38 is in poor health. At process 206, in some embodiments, the comparison circuit 142 may display the fault to the operator of the vehicle 10 via the operator I/O device 106. At process 210, in some embodiments, the comparison circuit 142 and/or an engine control circuit 144 may command the engine 18 to operate to increase the temperature of the exhaust gas stream. Increasing the temperature of the exhaust gas stream can burn residue and/or contaminants off of the NOx storage catalyst 38, thereby regenerating a health of the NOx storage catalyst 38. At process 214, in some embodiments, the upstream exhaust analysis circuit 130 and/or the prediction circuit 134 may deactivate in response to receiving information indicative of the disable parameter.

In some embodiments, the comparison circuit 142 is structured to generate a correction factor sized to reduce a difference between the predicted downstream NOx concentration and the determined downstream NOx concentration. In some embodiments, the correction factor may modify the storage capacity of the NOx storage catalyst 38 determined by the prediction circuit 134. In some embodiments, the correction factor may be based on the difference between the predicted downstream NOx concentration and the determined downstream NOx concentration. In other embodiments, the correction may be based on a sum of the differences between the predicted downstream NOx concentration and the determined downstream NOx concentration over an operating period of the vehicle 10. For example, in some embodiments, the operating period of the vehicle 10 may be a length of time since the vehicle 10 has been turned on.

In some embodiments, the comparison circuit 142 is structured to compare the correction factor to a correction factor threshold. For example, in some embodiments, the comparison circuit 142 is structured to determine a difference between the correction factor and the correction factor threshold to determine a health of the NOx storage catalyst 38. In response to determining that the correction factor is below the correction factor threshold, the comparison circuit 142 determines that NOx storage catalyst 38 is healthy. In response to determining that the correction factor is above the correction factor threshold, the comparison circuit 142 determines that the NOx storage catalyst 38 is unhealthy. In response to determining that the NOx storage catalyst 38 is unhealthy, the comparison circuit 142 can set a fault indicating that the NOx storage catalyst is unhealthy. In some embodiments, the comparison circuit 142 can display the fault to an operator of the vehicle 10 via the operator I/O device 106. In some embodiments, the comparison circuit 142 can initiate regenerative activity in an attempt to clear the fault. For example, in some embodiments, the comparison circuit 142 can command the engine 18 to increase a temperature of the exhaust gas stream. In some embodiments, increasing a temperature of the exhaust gas stream can burn residue and/or contaminates off of the NOx storage catalyst 38, thereby regenerating a health of the NOx storage catalyst 38.

In some embodiments, the prediction circuit 134 is structured to receive the correction factor from the comparison circuit 142. In some embodiments, the prediction circuit 134 may be structured to modify the predicted storage capacity of the NOx storage catalyst 38 based on the correction factor. In some embodiments, the prediction circuit 134 may be structured to modify the predicted downstream NOx concentration output from the lookup table and/or the mathematical model based on the correction factor.

Figure 4:
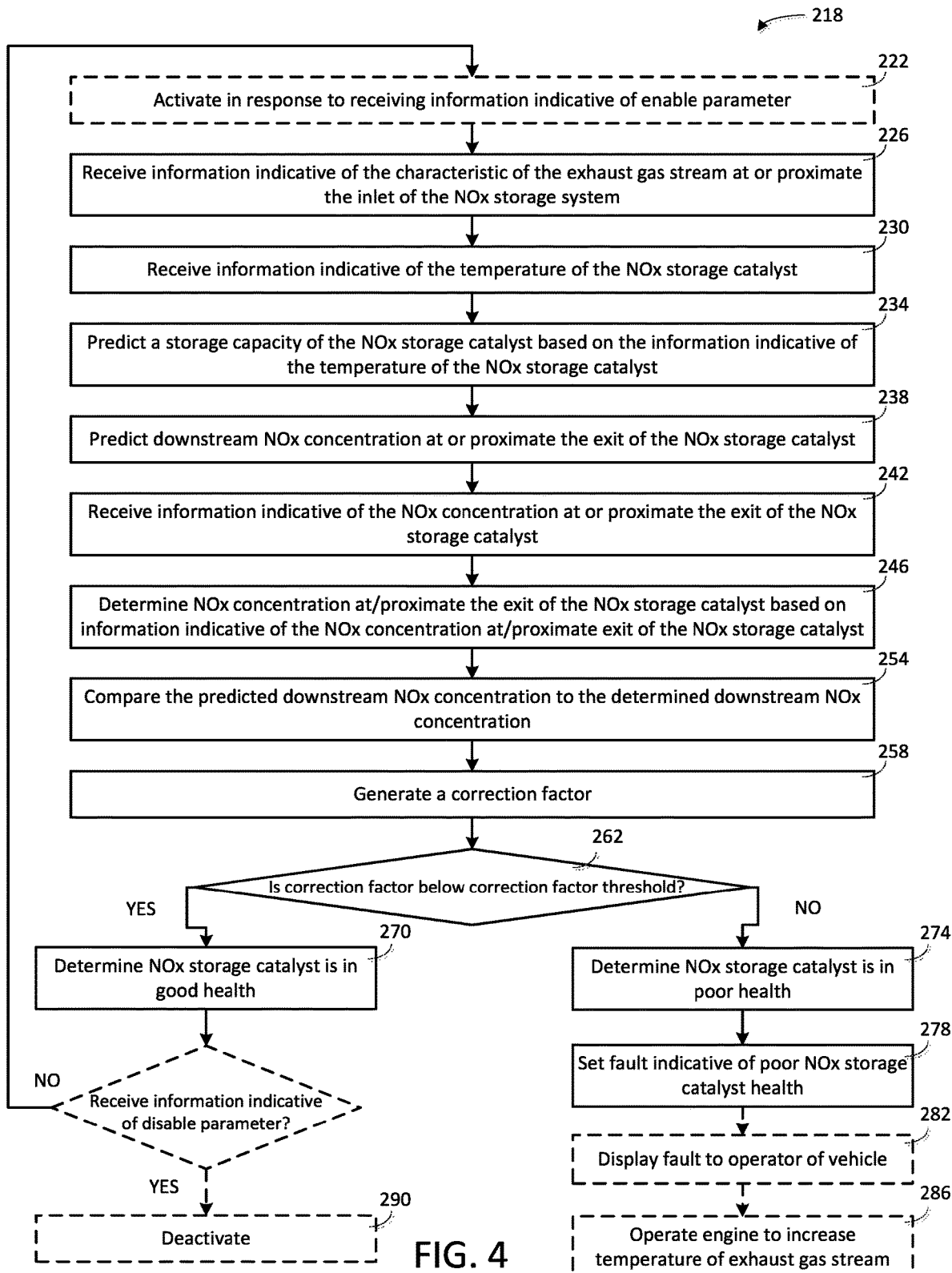
FIG. 4 is a flow diagram of a method for diagnosing a storage capacity of a NOx storage catalyst according to another example embodiment.

FIG. 4 illustrates an exemplary method 218 for determining a health of the NOx storage catalyst 38. At process 222, in some embodiments, the upstream exhaust analysis circuit 130 and/or the prediction circuit 134 may activate in response to receiving information indicative of the enable parameter. At process 226, the upstream exhaust analysis circuit 130 receives information indicative of the characteristic of the exhaust gas stream at or proximate the inlet of the NOx storage system 34 from the sensors 82, 86 and/or the virtual sensors. At process 230, the prediction circuit 134 receives information indicative of the temperature of the NOx storage catalyst 38 from the sensor 104 or the virtual sensor. At process 234, the prediction circuit 134 predicts a storage capacity of the NOx storage catalyst 38 based on the information indicative of the temperature of the NOx storage catalyst 38. At process 238, the prediction circuit 134 predicts the downstream NOx concentration at or proximate the exit of the NOx storage catalyst 38 based on the characteristic of the exhaust gas stream and the predicted NOx storage capacity of the NOx storage catalyst 38. At process 242, the downstream exhaust analysis circuit 138 receives information indicative of the NOx concentration at or proximate an exit of the NOx storage system 34 from the sensors 94, 102 or a virtual sensor. At process 246, the downstream exhaust analysis circuit 138 determines the NOx concentration at or proximate the exit of the NOx storage system 34 based on the information indicative of the NOx concentration at or proximate the exit of the NOx storage system 34. The comparison circuit 142 receives the predicted downstream NOx concentration from the prediction circuit 134 and the comparison circuit 142 receives the determined downstream NOx concentration from the downstream exhaust analysis circuit 138.

At process 254, the comparison circuit 142 compares the predicted downstream NOx concentration to the determined downstream NOx concentration. For example, in some embodiments, the comparison circuit 142 may determine a difference between the predicted downstream NOx concentration and the determined downstream NOx concentration.

At process 258, the comparison circuit 142 generates a correction factor. The correction factor is structured to reduce and/or minimize the difference between the predicted downstream NOx concentration. The prediction circuit 134 receives the correction factor from the comparison circuit 142. At process 266, the comparison circuit 142 is structured to compare the correction factor to the correction factor threshold to determine the health of the NOx storage catalyst. At process 270, in response to determining that the correction factor is below the correction factor threshold, the comparison circuit determines that the NOx storage catalyst 38 is in good health. At process 274, in response to determining that the correction factor exceeds the correction factor threshold, the comparison circuit 142 determines that the NOx storage catalyst 38 is in poor health. At process 278, the comparison circuit 142 sets a fault indicating that the NOx storage catalyst 38 is in poor health. At process 282, in some embodiments, the comparison circuit 142 may display the fault to the operator of the vehicle 10 via the operator I/O device 106. At process 286, in some embodiments, the comparison circuit 142 and/or the engine control circuit 144 may command the engine 18 to operate to increase the temperature of the exhaust gas stream. Increasing the temperature of the exhaust gas stream can burn residue and/or contaminants off of the NOx storage catalyst 38, thereby regenerating a health of the NOx storage catalyst 38. At process 290, in some embodiments, the upstream exhaust analysis circuit 130 and/or the prediction circuit 134 may deactivate in response to receiving information indicative of the disable parameter.

In some embodiments, the upstream exhaust analysis circuit 130 is structured to monitor the information indicative of the characteristic of the exhaust gas stream for a predetermined time period. The upstream exhaust analysis circuit 130 may begin monitoring the information indicative of the characteristic in response to receiving the enable parameter. The upstream exhaust analysis circuit 130 is structured to determine an amount of variation in the characteristic of the exhaust gas stream. In the present embodiment, the characteristic may further include a NOx concentration, an ammonia (NH3) concentration, and/or a hydrocarbon (HC) concentration of the exhaust gas stream. For example, the upstream exhaust analysis circuit 130 can be structured to compare the information indicative of the exhaust gas stream to a threshold value of the characteristic. The upstream exhaust analysis circuit 130 is structured to determine a perturbation status of the exhaust gas stream based on an amount of deviation of the characteristic of the exhaust gas stream from the threshold value of the characteristic during the predetermined time period. For example, the upstream exhaust analysis circuit 130 is structured to determine that the exhaust gas stream is in a perturbed state based on the amount of deviation exceeding a perturbation threshold during the time period. The upstream exhaust analysis circuit 130 is structured to determine that the exhaust gas stream is not in an perturbed state in response to the amount of deviation being below the perturbation threshold during the time period. The upstream exhaust analysis circuit 130 is structured to generate a perturbation command in response to receiving the enable parameter and determining that the exhaust gas stream is not in the perturbed state. The perturbation command is structured to command the engine system 12 to operate to change at least one of the characteristics of the exhaust gas stream. For example, the perturbation command may change at least one of an engine out NOx concentration, a DEF dosing command, etc. The perturbation can have a variety of shapes, such as a sine wave, a square wave, a pulse train, etc. In some embodiments, the perturbation signal can have a broad frequency spectrum such that the cutoff frequency of the NOx storage catalyst 38 can be determined. In some embodiments, the perturbation signal can have a single, fixed frequency. In such embodiments, the diagnostic can determine the attenuation of the specific frequency and compare the attenuation to a threshold attenuation value.

In some embodiments, the prediction circuit 134 is structured to predict a response of the NOx storage catalyst 38 to perturbation. The NOx storage catalyst 38 can act like a filter and can delay and/or smooth the system's response to the perturbation. The NOx storage catalyst 38 functions like a low-pass filter, providing delay and/or smoothing of the system's response to the perturbation when the NOx storage catalyst 38 is healthy. When the NOx storage catalyst is degraded, the characteristic is substantially the same at or proximate the inlet of the NOx storage catalyst 38 and at or proximate the outlet of the NOx storage catalyst 38. For example, in some implementations, the prediction circuit 134 can be structured to receive information indicative of the characteristic of the exhaust gas stream. The characteristic of the exhaust gas stream can include the perturbation state of the exhaust gas stream, the enable parameter, the perturbation command, the temperature of the exhaust gas stream, etc. In some embodiments, the prediction circuit 134 is structured to model the NOx storage catalyst 38 as a dynamic filter. In such embodiments, the prediction circuit 134 may predict a filter constant of the NOx storage catalyst 38 based on the characteristic of the exhaust gas stream and/or the temperature of the NOx storage catalyst 38. In some embodiments, a rate of NOx binding and/or NOx release from the NOx storage catalyst 38 changes in as the NOx storage catalyst 38 degrades. In such embodiments, the prediction circuit 134 may model the temperature-dependent binding and/or release of NOx from the NOx storage catalyst 38. For example, a rate at which the NOx storage catalyst 38 binds NOx during cold start operating conditions may be slower as the NOx storage catalyst 38 degrades.

In some embodiments, the downstream exhaust analysis circuit 138 is structured to receive information indicative of a response of the exhaust gas stream to the perturbation. For example, the downstream exhaust analysis circuit 138 is structured to determine a NOx concentration at or proximate the outlet of the NOx storage system 34 based on the information indicative of the NOx concentration of the exhaust gas stream at or proximate the outlet of the NOx storage system 34. The downstream exhaust analysis circuit may receive the information indicative of the characteristic of the exhaust gas stream from the sensors 94, 102 or the virtual sensors. In some embodiments, the downstream exhaust analysis circuit 138 can determine the filter constant of the NOx storage catalyst 38 based on the response of the exhaust gas stream to the perturbation. The downstream exhaust analysis circuit 138 can determine the response of the characteristic to the NOx storage catalyst 38 using techniques such as filtering, phase locked loops, etc.

In some embodiments, the comparison circuit 142 is structured to receive the predicted response to the perturbation from the prediction circuit 134 and the determined response to the perturbation from the downstream exhaust analysis circuit 138. The comparison circuit 142 is structured to compare the predicted response to the perturbation and determined response to the perturbation. For example, in some embodiments, the comparison circuit 142 is structured to determine a difference between the predicted filter constant and the determined filter constant of the NOx storage catalyst. In response to determining that the difference is below the predetermined difference threshold, the comparison circuit 142 determines that NOx storage catalyst 38 is healthy. In response to determining that the difference is above the difference threshold, the comparison circuit 142 determines that the NOx storage catalyst 38 is unhealthy. In other embodiments, the comparison circuit 142 can compare a rate of NOx binding to the NOx storage catalyst 38 under low temperature conditions to the predicted rate of NOx binding to the NOx storage catalyst 38. The comparison circuit 142 can determine that the NOx storage catalyst 38 in response to the comparison indicating that the determined rate of NOx binding is greater than or equal to the predicted rate of NOx binding. The comparison circuit 142 can determine that the NOx storage catalyst 38 is unhealthy in response to the comparison indicating that the determined rate of NOx binding is less than the predicted rate of NOx binding. The comparison circuit 142 can compare a determined rate of NOx release from the NOx storage catalyst 38 and the predicted rate of NOx release from the NOx storage catalyst 38 in a similar manner. In response to determining that the NOx storage catalyst 38 is unhealthy, the comparison circuit 142 can set a fault indicating that the NOx storage catalyst is unhealthy. In some embodiments, the comparison circuit 142 can display the fault to an operator of the vehicle 10 via the operator I/O device 106. In some embodiments, the comparison circuit 142 can initiate regenerative activity in an attempt to clear the fault. For example, in some embodiments, the comparison circuit 142 can command the engine 18 to increase a temperature of the exhaust gas stream. In some embodiments, increasing a temperature of the exhaust gas stream can burn residue and/or contaminates off of the NOx storage catalyst 38, thereby regenerating a health of the NOx storage catalyst 38.

Figures 5, 6:
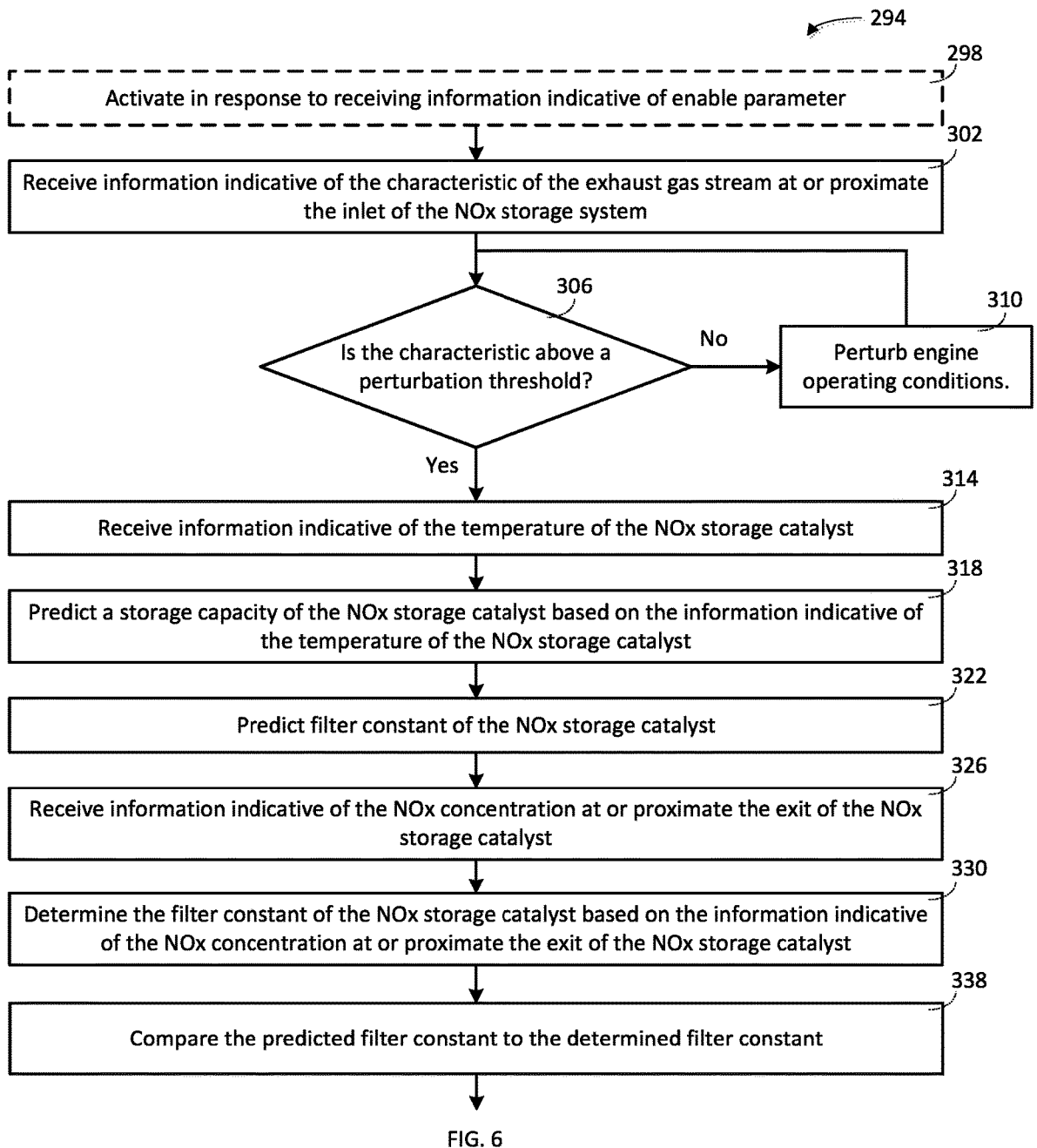
FIG. 5 is a flow diagram of a method for diagnosing a dynamic response of a NOx storage catalyst according to an example embodiment.
FIG. 6 is a flow diagram of a method for diagnosing a dynamic response of a NOx storage catalyst according to an example embodiment.
Figure 6:
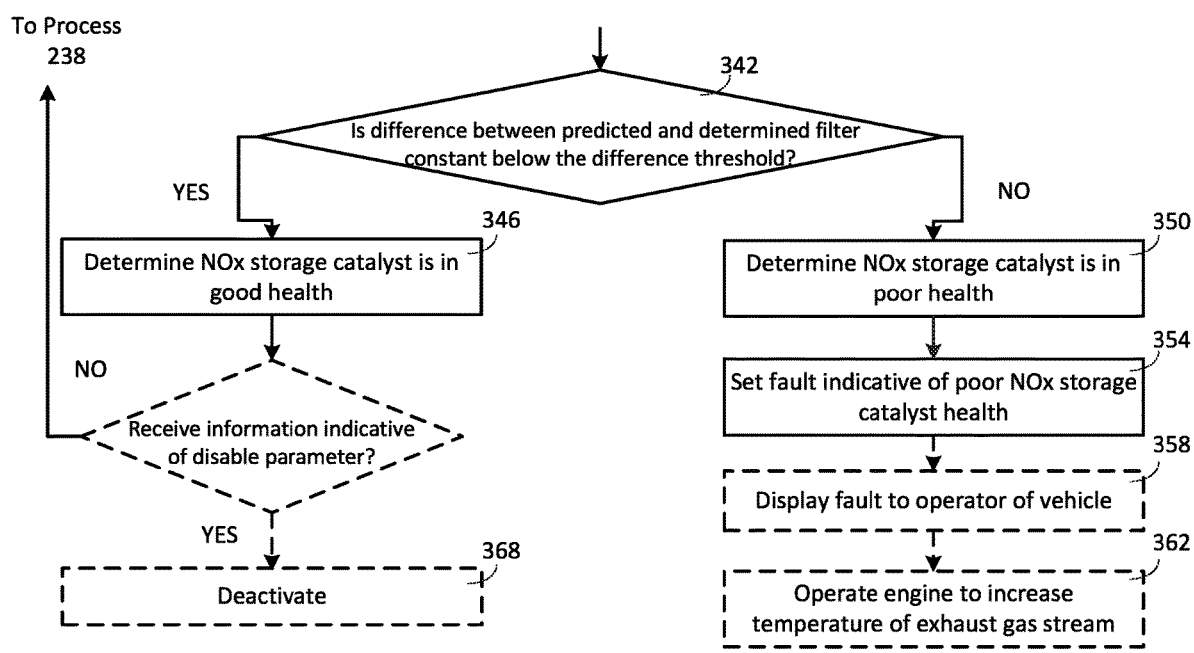

FIGS. 5-6 illustrate an exemplary method 294 for determining a health of the NOx storage catalyst 38. At process 298, in some embodiments, the upstream exhaust analysis circuit 130 and/or the prediction circuit 134 may activate in response to receiving information indicative of the enable parameter. At process 302, the upstream exhaust analysis circuit 130 receives information indicative of the characteristic of the exhaust gas stream at or proximate the inlet of the NOx storage system 34 from the sensors 82, 86 and/or the virtual sensors. At process 306, the upstream exhaust analysis circuit 130 compares the characteristic of the exhaust gas stream at or proximate the inlet of the NOx storage system 34 to a threshold characteristic to determine a perturbation status of the exhaust gas stream. In some embodiments, the perturbation status is based on an amount of deviation of the characteristic from the threshold value during a predetermined time period. The upstream exhaust analysis circuit 130 determines that the exhaust gas stream is in a perturbed state in response to the amount of deviation being above the threshold value during the predetermined time period. The upstream exhaust analysis circuit 130 determines that the exhaust gas stream is not in a perturbed state in response to the amount of deviation being below the threshold value during the predetermined time period. At process 310, the upstream exhaust analysis circuit 130 generates the perturbation command in response to determining that the exhaust gas stream is not in the perturbed state. The perturbation command is structured to generate and/or increase transience in the exhaust gas stream. In some embodiments, the perturbation command may change at least one of an engine out NOx concentration, DEF dosing, etc.

At process 314, the prediction circuit 134 receives information indicative of the temperature of the NOx storage catalyst 38 from the sensor 104 or the virtual sensor. At process 318, the prediction circuit 134 predicts a storage capacity of the NOx storage catalyst 38 based on the information indicative of the temperature of the NOx storage catalyst 38. At process 322, the prediction circuit 134 predicts the filter constant of the NOx storage catalyst 38. At process 326, the downstream exhaust analysis circuit 138 receives information indicative of the NOx concentration at or proximate an exit of the NOx storage catalyst 38 from the sensors 94, 102 or a virtual sensor. At process 330, the downstream exhaust analysis circuit 138 determines the filter constant of the NOx storage catalyst 38 based on the information indicative of the NOx concentration at or proximate the exit of the NOx storage catalyst 38. The comparison circuit 142 receives the predicted filter constant of the NOx storage catalyst 38 and the comparison circuit 142 receives the determined filter constant of the NOx storage catalyst 38 from the downstream exhaust analysis circuit 138.

At process 338, the comparison circuit 142 compares the predicted filter constant of the NOx storage catalyst 38 and the determined filter constant of the NOx storage catalyst 38. For example, in some embodiments, the comparison circuit 142 may determine a difference between the predicted filter constant of the NOx storage catalyst 38 and the determined filter constant of the NOx storage catalyst 38. At process 342, the comparison circuit 142 is structured to compare the difference to the difference threshold to determine the health of the NOx storage catalyst 38. At process 346, in response to determining that the difference is below the difference threshold, the comparison circuit 142 determines that the NOx storage catalyst 38 is in good health. At process 350, in response to determining that the difference exceeds the difference threshold, the comparison circuit 142 determines that the NOx storage catalyst 38 is in poor health. At process 354, the comparison circuit 142 sets a fault indicating that the NOx storage catalyst 38 is in poor health. At process 358, in some embodiments, the comparison circuit 142 may display the fault to the operator of the vehicle 10 via the operator I/O device 106. At process 362, in some embodiments, the comparison circuit 142 and/or the engine control circuit 144 may command the engine 18 to operate to increase the temperature of the exhaust gas stream. Increasing the temperature of the exhaust gas stream can burn residue and/or contaminants off of the NOx storage catalyst 38, thereby regenerating a health of the NOx storage catalyst 38. At process 368, in some embodiments, the upstream exhaust analysis circuit 130 and/or the prediction circuit 134 may deactivate in response to receiving information indicative of the disable parameter.

In some embodiments, the methods 150, 218, and/or 294 can be used in embodiments in which the NOx sensors 86, 94, 102 are not turned on during cold engine operating conditions, such as cold start conditions. In such embodiments, the prediction circuit 134 can model the operating conditions of the NOx storage catalyst 38 based on a temperature of the exhaust gas stream exiting the engine 18, a temperature of the NOx storage catalyst 38, and/or a time period that the engine 18 has been operating. After the temperature of the exhaust gas stream has increased to a temperature at which the NOx sensors 86, 94, 102 are operational (e.g., above approximately 150 degrees), the comparison circuit 142 may compare the predicted conditions of the NOx storage catalyst 38 with the determined conditions of the NOx storage catalyst 38. For example, the comparison circuit 142 may compare the predicted downstream NOx concentration with the determined downstream NOx concentration at exhaust gas temperatures in which the NOx storage catalyst 38 binds NOx in the exhaust gas stream. In another example, at temperatures at which the NOx storage catalyst 38 releases NOx into the exhaust gas stream, the comparison circuit 142 may compare a predicted rate and/or a predicted amount of NOx released into the exhaust gas stream by the NOx storage catalyst 38 to a determined rate and/or a determined amount of NOx released into the NOx gas stream by the NOx storage catalyst 38.

In some embodiments, the NOx storage catalyst 38 can store and/or oxidize hydrocarbons (HCs). In such embodiments, the exhaust aftertreatment system 22 may include HC sensors positioned in similar locations as the NOx sensors 86, 94, 102. In such embodiments, the upstream exhaust analysis circuit 130 can determine a concentration of HCs at or proximate the inlet of the NOx storage catalyst 38 similar to what is described above with respect to NOx. The prediction circuit 134 can predict HC binding to the NOx storage catalyst 38 similar to what is described above with respect to NOx. In embodiments in which the NOx storage catalyst 38 releases stored HCs, the prediction circuit 134 can predict HC release from the NOx storage catalyst 38 similar to what is described above with respect to NOx. In some embodiments, the NOx storage catalyst 38 can oxidize HCs. In such embodiments, the NOx storage catalyst 38 can predict an amount of HC oxidation by the NOx storage catalyst 38 using a look-up table, a mathematical model, etc. The downstream exhaust analysis circuit 138 can determine a concentration of HCs at or proximate the outlet of the NOx storage catalyst 38 similar to what is described above with respect to NOx. The comparison circuit 142 can compare the predicted and determined downstream HC concentrations as described above with respect to NOx to determine a health of the NOx storage catalyst 38. In embodiments in which the NOx storage catalyst 38 can bind and/or oxidize HCs, the methods 150, 218, and/or 294 can be used as described above with respect to NOx. The methods 150, 218, and/or 294 can determine the health of the NOx storage catalyst 38 based on HC binding, release, and/or oxidation either independently or in conjunction with the NOx binding and/or release as described above. In some embodiments, the NOx storage catalyst 38 can oxidize HCs at high temperatures. In such embodiments, the health of the NOx storage catalyst 38 can be determined at low exhaust gas temperatures based on NOx binding and/or release and the health of the NOx storage catalyst 38 can be determined at high temperatures based on HC oxidation.

In some embodiments, the NOx storage catalyst 38 can store oxygen (O2). In such embodiments, the exhaust aftertreatment system 22 may include O2 sensors positioned in similar locations as the NOx sensors 86, 94, 102. In such embodiments, the upstream exhaust analysis circuit 130 can determine a concentration of O2 at or proximate the inlet of the NOx storage catalyst 38 similar to what is described above with respect to NOx. The prediction circuit 134 can predict O2 binding to and/or release from the NOx storage catalyst 38 similar to what is described above with respect to NOx. The downstream exhaust analysis circuit 138 can determine a concentration of O2 at or proximate the outlet of the NOx storage catalyst 38 similar to what is described above with respect to NOx. The comparison circuit 142 can compare the predicted and determined downstream O2 concentrations as described above with respect to NOx to determine a health of the NOx storage catalyst 38. In embodiments in which the NOx storage catalyst 38 can bind O2, the methods 150, 218, and/or 294 can be used as described above with respect to NOx. The methods 150, 218, and/or 294 can determine the health of the NOx storage catalyst 38 based on O2 binding and/or release either independently or in conjunction with the NOx binding and/or release and/or HC binding, release, and/or oxidation as described above.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIG. 2 it should be understood that the controller 14 may include any number of circuits for completing the functions described herein. For example, the activities and functionalities of the circuits 130-142 may be combined in multiple circuits or as a single circuit. Additional circuits with additional functionality may also be included. Further, the controller 14 may further control other activity beyond the scope of the present disclosure.

As mentioned above and in one configuration, the "circuits" may be implemented in machine-readable medium for execution by various types of processors, such as the processor 122 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system comprising:
   a controller configured to:
   perform an enable operation responsive to receiving information indicative of an enable parameter, the enable operation comprising:
   determining a predicted downstream NOx value of an exhaust gas stream exiting a NOx storage catalyst;
   determining a downstream NOx value of the exhaust gas stream exiting the NOx storage catalyst;
   determining an error between the predicted downstream NOx value and the determined downstream NOx value;
   comparing the error to an error threshold; and
   determining that the NOx storage catalyst is in good health responsive to determining that the error does not exceed the error threshold; and
   perform a disable operation responsive to receiving information indicative of a disable parameter comprising a temperature of the exhaust gas stream indicating a warm engine operating condition, the disable operation causing a deactivation of at least a portion of the controller.

2. The system of claim 1, wherein the controller is further configured to:
   receive information indicative of a characteristic of the exhaust gas stream exiting the NOx storage catalyst; and
   wherein determining the downstream NOx value of the exhaust gas stream exiting the NOx storage catalyst is based on the information indicative of the characteristic of the exhaust gas stream exiting the NOx storage catalyst, the characteristic of the exhaust gas stream exiting the NOx storage catalyst including at least one of a NOx concentration, a temperature, or an oxygen concentration.

3. The system of claim 2, wherein determining the predicted downstream NOx value of the exhaust gas stream exiting the NOx storage catalyst is based on the characteristic of the exhaust gas stream and a predicted NOx storage capacity of the NOx storage catalyst.

4. The system of claim 1, wherein the NOx storage catalyst is a Passive NOx Adsorber (PNA), a Diesel Cold Start Catalyst (dCSC), or a Diesel Cold Start Concept (dCSC) catalyst.

5. The system of claim 1, wherein the controller is configured to determine the predicted downstream NOx value based on a model of a NOx storage capacity or a dynamic response of the NOx storage catalyst.

6. The system of claim 1, wherein the disable parameter comprises a specified amount of time that the exhaust gas stream has been above a temperature threshold.

7. The system of claim 1, wherein the controller is further configured to generate a correction factor based on a difference between the predicted downstream NOx value and the determined downstream NOx value.

8. The system of claim 7, wherein determining that the NOx storage catalyst is in good health is further responsive to determining that the correction factor does not exceed a correction factor threshold.

9. A method comprising:
   performing, by a controller, an enable operation responsive to receiving information indicative of an enable parameter, the enable operation comprising:
   determining a predicted downstream NOx value of an exhaust gas stream exiting a NOx storage catalyst;
   determining a downstream NOx value of the exhaust gas stream exiting the NOx storage catalyst;
   determining an error between the predicted downstream NOx value and the determined downstream NOx value;
   comparing the error to an error threshold; and
   determining that the NOx storage catalyst is in good health responsive to determining that the error does not exceed the error threshold; and
   performing, by the controller, a disable operation responsive to receiving information indicative of a disable parameter comprising a temperature of the exhaust gas stream indicating a warm engine operating condition, the disable operation causing a deactivation of at least a portion of the controller.

10. The method of claim 9, further comprising receiving information indicative of a characteristic of the exhaust gas stream exiting the NOx storage catalyst, wherein determining the downstream NOx value of the exhaust gas stream exiting the NOx storage catalyst is based on the information indicative of the characteristic of the exhaust gas stream exiting the NOx storage catalyst, the characteristic of the exhaust gas stream exiting the NOx storage catalyst is at least one of a NOx concentration, a temperature, or an oxygen concentration.

11. The method of claim 10, wherein determining the predicted downstream NOx value of an exhaust gas stream exiting the NOx storage catalyst is based on the characteristic of the exhaust gas stream and a predicted NOx storage capacity of the NOx storage catalyst.

12. The method of claim 9, wherein the NOx storage catalyst is a Passive NOx Adsorber (PNA), a Diesel Cold Start Catalyst (dCSC), or a Diesel Cold Start Concept (dCSC) catalyst.

13. The method of claim 9, further comprising determining the predicted downstream NOx value based on a model of a NOx storage capacity or a dynamic response of the NOx storage catalyst.

14. The method of claim 9, wherein the disable parameter comprises a specified amount of time that the exhaust gas stream has been above a temperature threshold.

15. An apparatus comprising:
at least one processor; and
at least one memory device storing instructions that, when executed by the at least one processor, cause the at least one processor to:
  perform an enable operation responsive to receiving information indicative of an enable parameter, the enable operation comprising:
    determining a predicted downstream NOx value of an exhaust gas stream exiting a NOx storage catalyst;
    determining a downstream NOx value of the exhaust gas stream exiting the NOx storage catalyst;
    determining an error between the predicted downstream NOx value and the determined downstream NOx value;
    comparing the error to an error threshold; and
    determining that the NOx storage catalyst is in good health responsive to determining that the error does not exceed the error threshold; and
  perform a disable operation responsive to receiving information indicative of a disable parameter comprising a temperature of the exhaust gas stream indicating a warm engine operating condition, the disable operation causing a deactivation of at least a portion of the apparatus.

16. The apparatus of claim 15, wherein the instructions further cause the at least one processor to receive information indicative of a characteristic of the exhaust gas stream exiting the NOx storage catalyst,
wherein determining the downstream NOx value of the exhaust gas stream exiting the NOx storage catalyst is based on the information indicative of the characteristic of the exhaust gas stream exiting the NOx storage catalyst, the characteristic of the exhaust gas stream exiting the NOx storage catalyst is at least one of a NOx concentration, a temperature, or an oxygen concentration.

17. The apparatus of claim 16, wherein determining the predicted downstream NOx value of the exhaust gas stream exiting the NOx storage catalyst is based on the characteristic of the exhaust gas stream and a predicted NOx storage capacity of the NOx storage catalyst.

18. The apparatus of claim 15, wherein the NOx storage catalyst is a Passive NOx Adsorber (PNA), a Diesel Cold Start Catalyst (dCSC), or a Diesel Cold Start Concept (dCSC) catalyst.

19. The apparatus of claim 18, wherein the instructions further cause the at least one processor to determine the predicted downstream NOx value based on a model of a NOx storage capacity or a dynamic response of the NOx storage catalyst.

20. The apparatus of claim 18, wherein the disable parameter comprises a specified amount of time that the exhaust gas stream has been above a temperature threshold.

* * * * *